United States Patent [19]

Cadot

[11] Patent Number: 5,646,871

[45] Date of Patent: Jul. 8, 1997

[54] PROCESS FOR SYSTEMS ANALYSIS

[75] Inventor: Michel Cadot, Saint-Maur, France

[73] Assignee: Bull, S.A., Louveciennes, France

[21] Appl. No.: 401,697

[22] Filed: Mar. 10, 1995

[30] Foreign Application Priority Data

Mar. 10, 1994 [FR] France ................. 94 02789

[51] Int. Cl.$^6$ ............ G06F 11/30; G06F 11/32; G05B 23/02
[52] U.S. Cl. ............ 364/579; 364/550; 364/551.01; 395/183.02; 395/916
[58] Field of Search ............ 364/550, 551.01, 364/579, 580; 395/183.02, 916

[56] References Cited

U.S. PATENT DOCUMENTS

| 3,324,458 | 6/1967 | MacArthur | 195/184.01 |
|---|---|---|---|
| 4,849,879 | 7/1989 | Chinnaswamy et al. | 395/916 |
| 5,058,113 | 10/1991 | Burnham et al. | 395/183.01 |
| 5,062,055 | 10/1991 | Chinnaswamy et al. | 364/551.01 |
| 5,081,598 | 1/1992 | Bellows et al. | 364/550 |
| 5,133,046 | 7/1992 | Kaplan | 395/61 |
| 5,351,247 | 9/1994 | Dow et al. | 395/183.02 |
| 5,557,548 | 9/1996 | Grover et al. | 364/551.01 |
| 5,586,057 | 12/1996 | Patel | 364/551.01 |

FOREIGN PATENT DOCUMENTS 0259224  9/1988  European Pat. Off. .

OTHER PUBLICATIONS

Proceedings of the 7th Conference on Artificial Intelligence Applications, 24 Feb. 1991, Miami Beach, US; pp. 389–392, XP299010: Se Young Park et al "OASiX: A Real-Time Knowledge-Based Systme for UNIX Operations and Administration" * p. 389, right col., line 30–p. 391, left col., line 34.

IBM Technical Disclosure Bulletin,. vol. 34, No. 7A, Dec. 1991, New York, US; p. 260, XP255521; "LAN Disk Space Monitor", entire document.

Ch. Devoney "Using PC DOS, 2nd Edition" 1987, Que Corp, Carmel, Indiana, US; Chapter 14: Customizing DOS * p. 301, line 1–p. 317, line 23.

Primary Examiner—Edward R. Cosimano
Attorney, Agent, or Firm—Kerkam, Stowell, Kondracki & Clarke, P.C.; Edward J. Kondracki

[57] ABSTRACT

A process for systems analysis of a database non-agreement system using a set of gauges. Measurement of the state of a system. A gauge function, a threshold value and a recommendation are associated with at least one part of the gauges. Each gauge function returns a value which characterizes the state of the system analyzed and a recommendation based on the logical relationship between the value returned and the threshold value is emitted for the user of the system. The gauges for the analysis of a system are grouped into investigations. The process can be adapted to the analysis of any system by editing an ASCII data file which contains the list of gauges, of the designations of the associated functions, and of the associated thresholds and the associated recommendations. A graphic interface makes it possible to select the investigations to be applied to the system.

32 Claims, 3 Drawing Sheets

PROCESS FOR SYSTEMS ANALYSIS

FIELD OF THE INVENTION

The invention relates to a process for systems analysis to determine the state of a system and eventually to emit recommendations intended for the user of the system. For example, the process can be applied to the administration of a data base management system (designated by the acronym DBMS), in order to analyze the state of a data base management system and to emit recommendations intended for the administrator. Therefore, another subject of the invention is an information carrier, such as a diskette or a magnetic tape, incorporating a program which implements the process of the invention, as well as a system, specifically a DBMS, which implements the process of the invention.

BACKGROUND OF THE INVENTION

A systems analysis device can be represented in a general way by FIG. 1. The analysis device 1 analyzes the system 2 using gauges 3. Each gauge seeks to obtain a specific piece of information on the state of the system 3. One gauge therefore returns one measurement of the system 2. The result 4 returned by the gauges is transmitted to the analysis device 1. Based on these results, this device can emit recommendations 5 to a destination, for example a user of the system 2.

What is meant by the term "system" is any collection of physical or conceptual objects on which measurements can be performed in order to extract pieces of information from them. The system 2 can be, for example, a data base management system on which an administrator would like to obtain information. The device 1 will then be, for example, a module incorporated into a program for assisting the administrator of the data base. The administrator can, at regular intervals, activate this module in order to know whether everything is proceeding correctly in the data base and its server, or whether it is necessary to undertake a reorganization. Certain gauges 3 will measure, for example, the fragmentation ratio of the tables in the DBMS, others the space available for these tables. Based on the results 4 obtained by these gauges, recommendations 5 for the administrator will be displayed on a screen or written into an assistance file. The recommendation obtained will be, for example, a message requesting that a table be defragmented or that space on a hard disk be deallocated.

In another example, the device 1 can be an automatic diagnostic device, capable of performing a diagnosis on a human body 2. The gauges 3 will then measure, for example, the level of glycemia in the blood, or the blood pressure. Based on the results returned by these gauges, recommendations 5 for the practitioner will be returned by the device.

It can be desirable to have the use of a multi-purpose analysis device which is capable of being adapted to very diverse tasks, and of emitting appropriate recommendations in each situation, while retaining a common interface for the user and therefore standardized usage. In the case in which the device 1 is embodied by means of a computer program, it is also desirable to be able to adapt it while keeping the largest possible part of the code unmodified. In the prior art, this adaptation was possible only by modifying the code of the program of the device 1 and by effecting a recompilation of it. This required possession of a copy of the code and a program capable of compiling it. Moreover, this operation required solid expertise in programming and a considerable amount of time. Thus, it was not within reach of the average user of the device 1. Moreover, generally only limited portions of the code could be re-used.

Even small-scale adaptations are difficult to achieve with the solutions of the prior art. In practice, a data base administrator who wished to have the use of a non-standard gauge to obtain recommendations of a novel type for his DBMS was limited to operating a personalized version of his administration device. The thresholds which trigger the gauges, that is the values of the results 4 based on which a recommendation was emitted, could only be adjusted in the rarest of cases. If certain pieces of information, which could be slow to obtain, were of no importance to the administrator, he generally had no possibility of excluding them.

OBJECT OF THE INVENTION

An object of the invention is thus to create an analysis tool that is general enough to be adaptable to the analysis of very diverse systems, while preserving a common interface for the user.

Another object is to make available a process for systems analysis which includes a maximum number of steps which are independent from the system to be analyzed.

Another object is to make available a data processing system analysis device which is adaptable to the analysis of any system without recompilation of the code.

Another object is to allow the user of such a device to add, eliminate, or modify gauges as easily as possible.

Another object is to allow the user to use a single device to perform the most diverse analyses on different systems.

SUMMARY OF THE INVENTION

Thus, the invention relates to a multi-purpose process for systems analysis using a set of gauges, in which all the characteristics belonging to the system are contained in data files.

The subject of the invention is a process for systems analysis using a set of gauges, each gauge being associated with at least one gauge function returning a value which depends on the state of the system analyzed, the value returned by the gauge functions being used during the process to display recommendations for the system on a screen or write them in a file, and the designation of the gauge functions applied to the system analyzed being contained in a data file.

In another characteristic of the invention, at least one part of the gauge functions is designated in the data file by the name and the and the data path of an executable program.

In another characteristic of the invention, at least one part of the gauge functions is designated in the data file by the text of a request, an SQL request for example.

In another characteristic of the invention, each gauge is associated with at least one recommendation and the list of recommendations is contained in a data file.

In another characteristic of the invention, each gauge is also associated with at least one numerical or logical threshold value, the recommendations are emitted when the values returned by the gauge functions are in a certain relationship with the associated threshold, and the list of numerical threshold values is contained in a data file.

In another characteristic of the invention, a symbol (>, <, = ...) is associated with the numerical thresholds in the list of numerical threshold values, this symbol indicating whether the associated recommendation must be triggered when the value returned by the associated gauge function moves above or below the threshold or when it does not have the same value as the threshold or when any other logical relationship exists between the threshold value and the value returned by the gauge function.

In another characteristic of the invention, the designation of the gauge functions, the list of the associated recommendations and the list of the associated threshold values are contained in a single data file, called the configuration file, which can be chosen from a menu of several configuration files.

In another characteristic of the invention, the configuration file also contains a list of alarm thresholds associated with the gauges.

In another characteristic of the invention, the configuration file is a text file, an ASCII file for example.

In another characteristic of the invention, the gauges are grouped into investigations, an investigation file including the list of investigations, of the gauges which constitute these investigations and of the designations of the global gauge functions associated with at least one part of the investigations, a gauge file including the list of all the gauges, of all the associated recommendations, of the thresholds associated to at least certain gauges, and of the gauge functions associated with at least certain gauges, the configuration file can be set up from data in the gauge file and data in the investigation file.

In another characteristic of the invention, if different gauge functions are associated with gauges in the gauge file and with corresponding investigations in the investigation file, then the configuration file is set up by using the gauge functions in the investigation file for these gauges.

In another characteristic of the invention, the process includes a step for selecting the gauges to be applied to the system by means of a graphic interface which makes it possible to choose a configuration file, a step for applying the gauges listed in the configuration file to the system analyzed by means of a motor module, and a step for emitting recommendations by means of an emission module. The graphic interface, the motor module and the emission module are independent of the system to be analyzed.

In another characteristic of the invention, the graphic interface make it possible to display on a screen at least a partial list of the gauges contained in the configuration file which have been selected and grouped into investigations, and to select the investigations that one desires to initiate in order to analyze this system.

The invention applies to the analysis of a system, more specifically a data base management system. In the context of a DBMS, one characteristic of the invention resides in the fact that the gauge file contains at least one gauge for testing the fragmentation of the tables in the DBMS. The gauge file can also contain a gauge for testing the space available for the tables in the DBMS.

Other subjects of the invention are an information carrier, such as a diskette or a magnetic tape, incorporating a program which implements the process of the invention, as well as any system, specifically a DBMS, which implements this process.

BRIEF DESCRIPTION OF THE DRAWINGS

Other characteristics and advantages of the invention will appear through a reading of the description, given below as an example and illustrated by the appended drawings.

DESCRIPTION OF THE PREFERRED EMBODIMENTS

Figure 1:
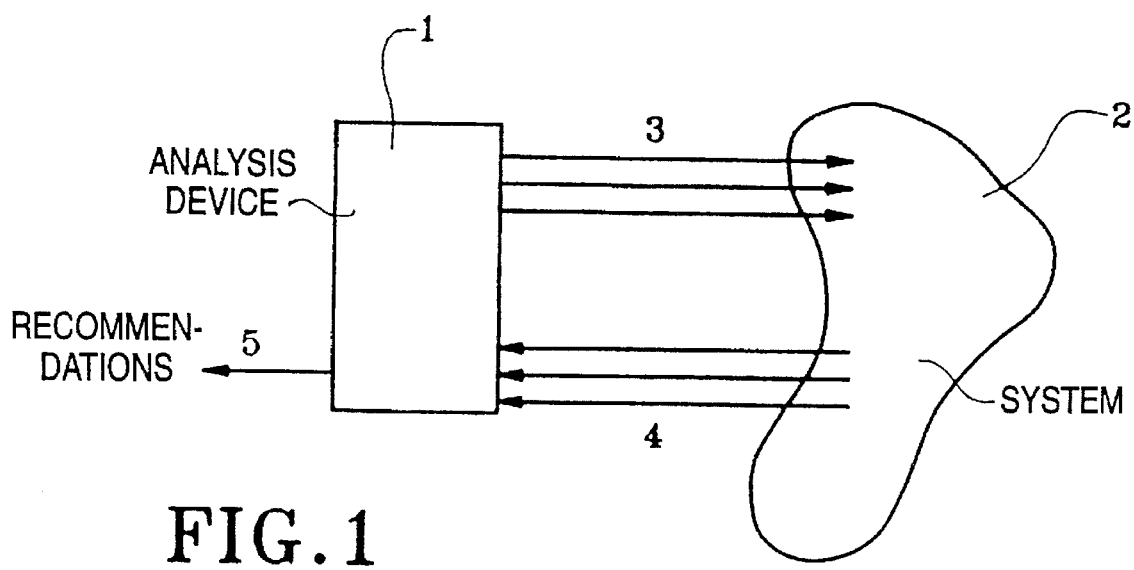
FIG. 1 illustrates in a general way a device for systems analysis and emission of recommendations.

For purposes of clarity of the description, the process will be used as an example for the analysis of a DBMS. More precisely, the example relates to an analysis tool incorporated into an assistance program for the administrator of a DBMS known by the registered trade name Oracle, produced by the company Oracle Corp, using the standardized SQL language (Structured Query Language) and operating on a UNIX station, a trade mark registered by the company UNIX System Laboratories, Inc. This example of utilization, however, is in no way limited, one of the advantages of the invention being precisely that it can easily be adapted to the analysis of very diverse systems.

The analysis of the state of a system in general, and of a DBMS in particular, can be performed by means of a series of investigations. One investigation, for example, can relate to the fragmentation of the data, another to the space available for the tables. Each investigation can be broken down into a set of pieces of information which will be called gauges. Thus, the investigation of available space can be broken down into one gauge which detects that there is hardly any room left for certain tables, and another gauge which indicates a substantial increase in the number of tables. Each gauge is associated with a gauge function which performs an analysis of the system. The gauge functions return a numerical or Boolean result which characterizes the state of each object in the system analyzed. In addition, each gauge is associated with a recommendation. The recommendation can consist of a message which, for example, informs the user of the need to defragment certain tables or to release space for other tables. Each gauge can have an associated value: the threshold which triggers the recommendation. The triggering threshold can be numerical: for example, the fragmentation ratio based on which a recommendation is emitted. It can also be logical, for the gauges which return a Boolean value. For example, it is possible to envision a gauge returning the Boolean value "1" if objects in the DBMS have reached the maximum number of authorized extensions (extents). The logical threshold, based on which a recommendation is emitted, is therefore equal to the logical value "1." A symbol >, < or # is associated with this threshold, indicating whether the recommendation is emitted when the value returned by the gauge moves above or below the threshold, or when it does not have the same value as the threshold. Other types of relationships (greater than or equal to, etc . . . ) can naturally be envisioned. This relation can be implicit, particularly for logical thresholds. In this case, all the gauges returning one of the Boolean values, for example "1," then form the object of an emitted recommendation. The recommendations can be simple strings of characters displayed on the screen or written in a recommendations file. Preferably, these strings are parameterizable in the format used for the printf() function in the language known as C, which uses parameters of the %s and %d type. A typical recommendation will be, for example:

"L""table space" ("tablespace" in Oracle terminology)%s is almost full (occupation rate=%d%%). You can add data base files to enlarge this space."

In this example, the %s parameters pertain to the display of the table spaces (tablespaces) in question and the %d parameter to the corresponding occupation rate.

Figure 2:
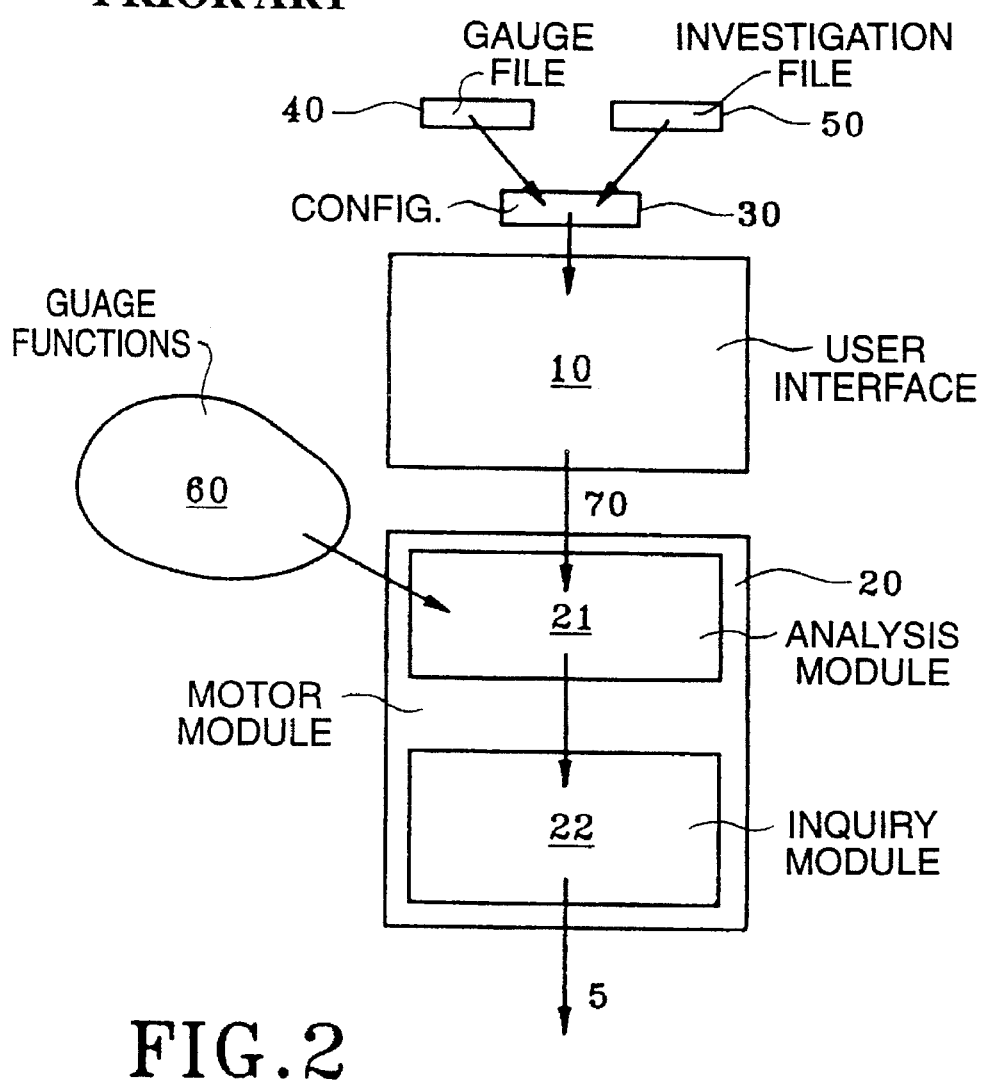
FIG. 2 illustrates the different modules of a device using the process of the invention.

FIG. 2 illustrates a device using the process of the invention. The device is divided into two layers: a user interface 10 and a motor module 20. The interface between these two layers is established via a command file 70, described below, which indicates to the motor module all the parameters necessary to conduct the investigations. The motor module can be divided into two functional blocks, the analysis module 21 and the inquiry module 22. This division is purely functional and does not necessarily correspond to a separate embodiment of the two modules. Thus, the analysis module and the inquiry module can form just a single entity. The motor module performs the investigations requested in the command file on the system to be analyzed. In order to do this, the analysis module analyzes the command file which is transmitted to it, whereas the inquiry module successively calls the various functions associated with the gauges and with the investigations. Certain gauge functions 60 can be external, that is stored in modules or programs which are independent of the device. Other gauge functions can be inside the inquiry module. The inquiry module determines the objects of the system analyzed on which recommendations must be emitted. These objects can be, for example, tables in the DBMS before they have been defragmented. The inquiry module displays recommendations 5 which relate to these objects and which concern the administration of the DBMS or the server on the DBMS administrator's screen or writes them in a recommendation file.

The user interface 10 is preferably embodied in the form of a graphic interface module. After the activation of the device, the interface reads a configuration file 30 and displays it. The configuration file is preferably a text file, an ASCII file in the present example, stored in a bulk memory. We will return to this configuration file later. The data in the configuration file come from a gauge file 40 and an investigation file 50, also described below.

Figure 3:
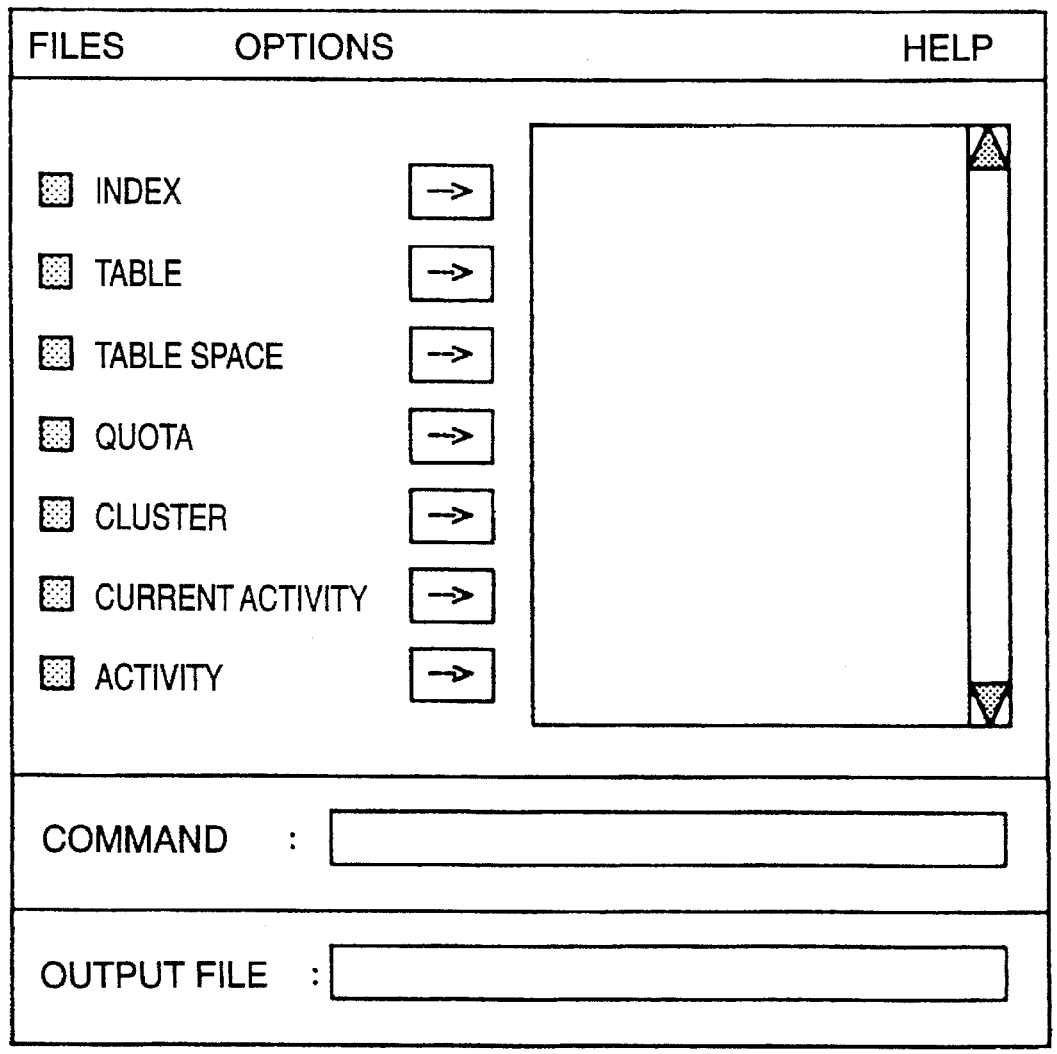
FIG. 3 illustrates an example of a hello screen displayed by a program using the process of the invention.

The screen displayed by the graphic interface upon activation of the device is illustrated in FIG. 3. These pieces of information are preferably contained in a window which occupies a reduced portion of the screen. This window contains five parts:

1. A menu bar which includes the menus File, Options, and Help.
2. A list on the left, which will be called the list of investigations.
3. A scrolling list on the right, which will be called the list of gauges.
4. A Command field.
5. An Output File field.

The Help menu makes it possible to obtain pieces of information to help the user. The Options menu makes it possible, for example, to cause the appearance of a dialogue box which allows the user to choose the monitoring duration and the sampling period for the investigations which use these parameters, which will be explained below. The File menu offers the following choices:

"New" to generate a new configuration file from the investigations file and the gauge file.

"Open . . . " to load a configuration file chosen from a scrolling list, the first file offered in the list being the default configuration file.

"Save" to store the current configuration file.

"Save as . . . " to store the current configuration file under a specific name.

"Print" to print the current configuration file.

"Execute" to initiate the investigations of the current configuration file.

"Quit" to quit the program.

The "list of investigations" part contains the list of the investigations conducted on the system analyzed which will eventually lead to the emission of recommendations. In the case of a utilization of the device for the needs of a data base administrator (designated by the acronym DBA), these investigations are pre-selected and the novice DBA has only to activate the "Execute" command from the File menu to obtain the recommendations for the DBMS. The user, who wants only certain pieces of information, de-selects the non-desired investigations then clicks on the Execute command.

Upon activation of the device, the window displays the contents of the default configuration file. This default configuration file will be written for a particular utilization such as, for example, DBMS administration or diagnostics. Using the Open command in the File menu, the user can load another configuration file which has been previously stored using either the Save or Save As command, which gives him the list of desired investigations directly.

The investigations presented in this figure are, naturally, only one example for this particular case of utilization of the device for data base administration.

The Command field makes it possible to enter the name and the parameters of a command or an executable program which will be initiated at the end of the utilization. In a DBMS environment of the Oracle type, a command could be, preferably, in the SQL format, and a program could be any executable UNIX program. This capability makes it possible to link the recommendations program with another program.

The Output File field allows the user to enter the name of the file in which he will be able to retrieve the recommendations. A default name will be proposed to him in the default configuration file. A specific name will allow him to display the recommendations directly on a screen or a printer connected to the device.

Figure 4:
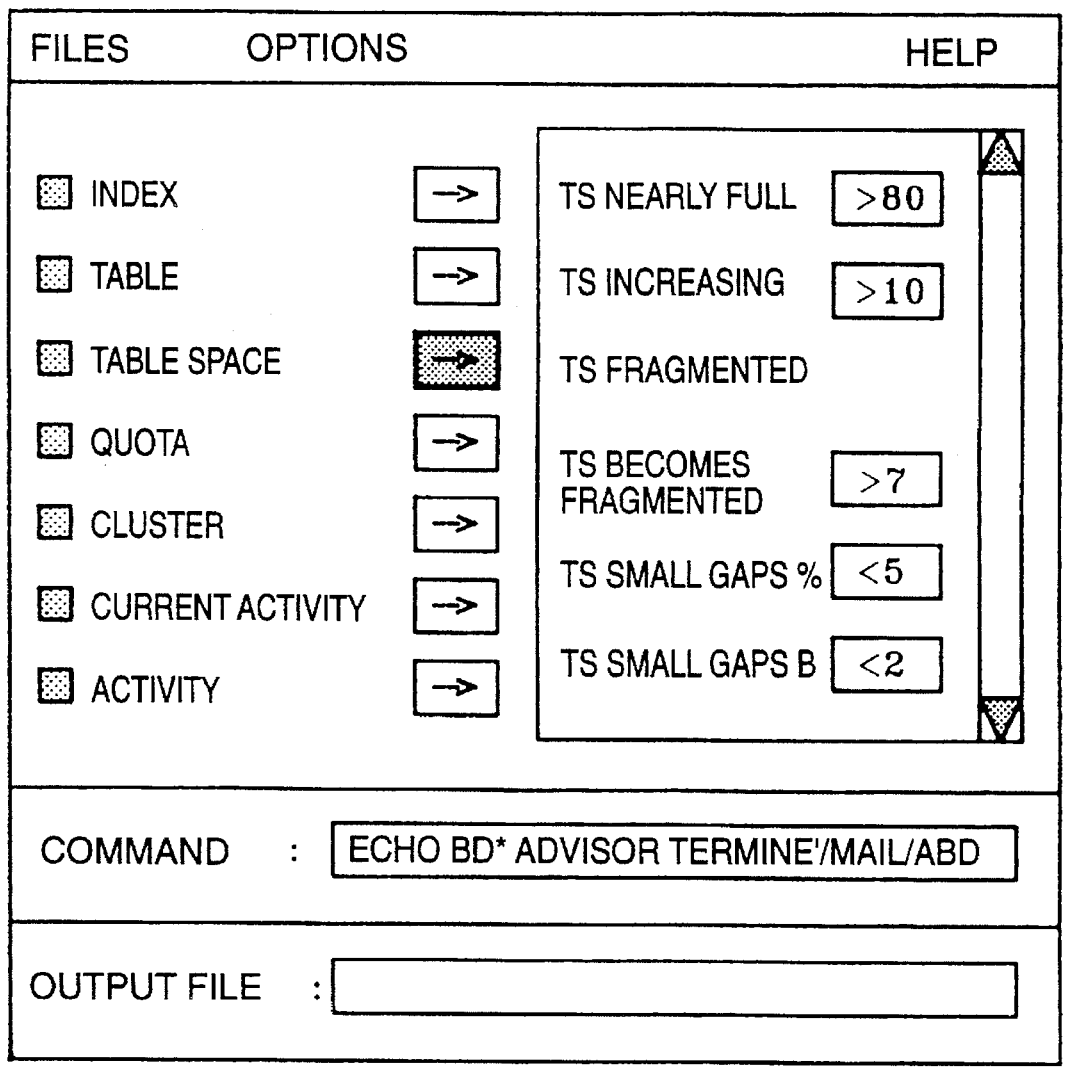
FIG. 4 illustrates an example of another screen displayed by a program using the process of the invention.

The more informed user can obtain additional pieces of information by clicking on the button to the right of one of the investigations; this then shifts to reverse video, and the list of the gauges associated with this investigation appears in the list of gauges section. An example is illustrated in FIG. 4. It is evident here that the investigation called "tablespace" in the terminology belonging to the Oracle data base (TS, in brief) and which will be called "table space" (TS), is composed of several gauges. Most of these gauges are associated with a numerical threshold value, from which a recommendation will be written in the selected output file. For example, the gauge "TS almost full" is associated with the numerical threshold 80. A gauge, such as "TS fragmented" in the example, does not have to have the associated threshold value: These are gauges associated with gauge functions which return a Boolean value, and the threshold concept is therefore implicit. For example, a recommendation is emitted if the logical value returned by the gauge function is equal to "1." The value of the numerical thresholds is read in the configuration file and can be modified directly by the user on the screen. A relationship symbol, for example <, >, or #, is linked to each threshold value. This symbol indicates whether the recommendation must be emitted when the result returned by the gauge function is less than, greater than, or different from the value of the associated numerical threshold. Thus the recommendation associated with the gauge "TS almost full" will be emitted if the associated gauge function returns a numerical value greater than 80.

A search takes place for all the objects in the system for which the gauge has significance. In this example, for the gauges which compose the investigation Table Space, the search will be for all the table spaces (tablespaces) in the DBMS.

After the activation of the device, the graphic interface reads and displays the contents of the default configuration file. The user has the possibility of choosing another configuration file using the Open command. By clicking, he can de-select certain investigations and modify the threshold values associated with the gauges. Then he initiates the analysis of the system using the Execute command. The graphic interface then generates a command file which describes the selection made by the user, and activates the motor module by passing this file to it in argument form and by redirecting the standard output to the file entered in the "Output File" field. This file can be any text file, or can directly be a screen or a printer connected to the device.

Next, the motor module analyzes the commands file which has been transmitted to it and successively calls the various gauge functions which generate the recommendations. Finally, the motor module initiates the potential command given by the user.

The contents of the gauge file, an excerpt of which is given as an example in the appendix at the end of the description, will be described. This file gives the definitions of the gauges. It groups the definitions of all the gauges used for the given type of application (DBMS or automatic diagnosis, for example) in a single place, thus allowing modifications or additions to be effected in a single place. This file is used by the graphic interface module to create a new configuration file using the New command in the File menu. The gauges are grouped into fields and sub-fields. This classification is not indispensable to the operation of the device, although it makes it possible in particular to clarify the reading of the gauge file. This file is a data file in the text format (ASCII). It is therefore modifiable by means of a simple text editor. Since it obeys sufficiently strict rules of syntax, it is preferable, however, to edit it by means of a specialized program for display and modification, which preferably uses a graphic interface. This program is not described here, since it is not directly involved with the invention.

Each line of the gauge file is constituted by one or more keywords (indicated in bold face in the files below) and associated values.

The keyword "field" introduces a new field which is terminated by the keyword "end-field," just as the keyword "subfield" introduces a new sub-field which is terminated by the keyword "end-subfield." The names of the fields and subfields must be unique. The definition of a gauge is included between the keywords "gauge" and "end-gauge" and has a certain number of parameters:

the name of the gauge, on the same line as the keyword "gauge."

possibly, between "comment" and "end-comment," an associated comment which indicates the significance of the gauge.

possibly a threshold and a relationship symbol introduced by the keyword "threshold." Certain gauges do not have an associated threshold, such as the gauge "TS fragmented" in the example.

possibly a designation of a gauge function introduced by the keyword "advice-function." This gauge function returns either a Boolean value which indicates that a recommendation must be emitted, or a numerical value which will be compared by means of the relationship symbol to the threshold value associated with the gauge in order to emit a recommendation.

between the keywords "advice" and "end-advice," the recommendation associated with the gauge. This recommendation is parameterizable, as explained above, in the style of the C-language format. A gauge can be associated with several recommendations.

In one embodiment of the device more specifically adapted to a DBMS administration application, the gauge functions can be three types:

the keyword DBA_EXPERT_INTERNAL preceding a designation of a gauge function indicates that the gauge uses a function inside the motor module, which will therefore execute it directly. The user can neither add nor modify the gauge functions of this type without recompiling the motor module by accessing its code. Their usage will therefore preferably be reserved either for gauges of very general interest, or for gauges for which speed constraints are imperative.

the key-word DBA_EXPERT_SQL introduces the text of an SQL request, terminated by a line which contains only the keyword "end-advice-function." This request will have to return two values: object (name of table, for example), and value (number of extensions, for example), and will be executed by the motor module using the threshold value introduced by the keyword "threshold." The object value designates all the objects in the system analyzed for which the recommendations associated with the gauge must be emitted.

the designations of the gauge functions of the executable program type are not introduced by any specific keyword. The name and the path of the program are given directly after the keyword "advice-function." These functions will be able to be written directly by the user.

The contents of the investigations file, an excerpt of which is found as an example in the appendix attached at the end of the description, will now be described. This file gives the definitions of the investigations. It makes it possible to group the definitions of the investigations in a single place, thus allowing modifications or additions to be effected in a single place. The advantage of the investigations is to group together several gauges which have a related significance or function. The grouping of the gauges into investigations is not only apparent on the screen displayed by the graphic interface; but is also done during the analysis of the system, as will be seen. Like the gauge file, this file is a data file in the text format (ASCII) which is editable by means of a text editor or a specialized program using a graphic interface. This file, in concert with the gauge file, is used by the graphic interface module to create new configuration files using the New command in the File menu. The architecture and the syntax of this file are similar to those of the gauge file.

The investigations are grouped into fields. This classification is not indispensable to the operation of the device, although it makes it possible in particular to clarify the reading of the investigations file. The fields are not necessarily the same as those defined in the gauge file, although a concordance is recommended. An investigation is constituted by a set of gauges. The object of the investigations file is to describe how the gauges are organized into investigations. An investigation can be associated with a global gauge function, introduced by the keyword "advice-function." This function can be one of the types defined in connection with the gauge file (internal, SQL or external). However, in a preferred relationship, this function will only be able to be the internal or external type. The advantage of having a global gauge function becomes apparent when the different gauges of an investigation use the same pieces of information, or neighboring pieces of information which can easily be accessed with a single inquiry. This gauge function, therefore, is called just once for all the gauges of the investigation. However, if a gauge is already associated with a function in the investigation file, it will be used for the analysis of the system.

The contents of the configuration file, an excerpt of which is found as an example in the appendix at the end of the description, will now be described. This file is built from the indications in the gauge file and the investigations file by using the New command of the File menu in the graphic interface. Other files can exist and can be loaded using the Open command in the same menu. Just like the gauge file and the investigations file, the configuration file is a data file in the text format (ASCII). The architecture and the syntax are similar to those of the other files. The indications of fields, investigations, and gauges are retrieved, possibly with their associated thresholds and the associated relationship symbol, as well as the designation of the gauge functions, which can be one of the three types mentioned above (internal, external, or SQL). The keyword "command" introduces the command to be initiated after the end of the analysis. In the example given in the appendix, this command is an SQL command which causes the sending of a message to the DBA. The keyword "output" introduces the name of the output file. The fields are those indicated in the investigations file. They can be visually separated in the graphic interface (for example, by a broken line between the fields in the list of investigations). Moreover, there is a basic configuration file: It is the default file which is automatically loaded upon activation of the device. In the dialog box displayed by the Open command in the File menu, this file is designated by the name DB_ADVISOR_DEFAULT.

The contents of the commands file, an excerpt of which is found as an example in the appendix at the end of the description, will now be described. This file is generated by the graphic interface module from the configuration file, taking into account the potential modifications chosen by the user, and transmitted in parameter form to the motor module. This module then analyses it in order to generate the investigations on the system analyzed. At the end of the investigations, this file is destroyed. Like all the other data files introduced, it is a file in the text format (ASCII), constituted by a set of keywords (parameters) and associated values. The example given in the appendix uses the same examples given for the other files. This file gives, for each gauge, the following associated indications: the designation of the associated gauge function, possibly the threshold level and the associated relationship symbol, and the recommendation. The gauges are grouped into investigations, with certain investigations being able to have the associated global gauge functions. Organization of the investigations into fields is not employed; in fact, this organization is mainly important for the presentation of the graphic interface. The keyword "sampling" introduces on the same line the duration (preceded by the keyword "duration") and the period (preceded by the keyword "period") of sampling for the investigations which need these concepts. The keyword "command" introduces the command to be initiated after the various investigations.

The various modes of utilization of the device will now be explained. The novice mode is the simplest usage mode. The novice user activates the device, which automatically loads the default configuration file, and initiates the investigations simply by clicking on the Execute command in the File menu. After the end of the analysis of the system, the user can read the recommendations in the output file (possibly directly on the screen).

The intermediate mode allows the user to choose the investigations he wishes to conduct on his system. He chooses from the list of investigations displayed by the graphic interface those which interest him. He can save his choices in a new configuration file, and re-load it later thanks to the Open command in the File menu.

The expert mode allows the informed user to modify the thresholds associated with the gauges which constitute the investigations, by the method described in connection with FIG. 4.

The user who wishes to add gauges proceeds in the following manner. First of all, he adds the definitions of the new gauges into the gauge file, including the values of the potential thresholds, the relationship symbols, the recommendations and the designations of the associated functions. The functions associated with these new gauges can be, for example, new programs which analyze one aspect of the system and return either a Boolean value, or a numerical value which is compared with the threshold value in order to emit the recommendation. These new programs are created and compiled independently from the others which constitute the device. Then, the user edits the investigations file, in order to redefine the organization of the gauges into investigations and into fields. If necessary, new fields and new investigations can be created for these gauges. The gauge file as well as the investigations file can both be edited by means of a simple text editor which supports a text format, or even better, by means of a specialized graphic tool, in order to avoid the syntax problems linked to these two files.

Once the graphic interface module has been activated, the New command in the File menu makes it possible to create a new configuration file from the gauge file and the file of modified investigations. This file can be modified again by means of the graphic interface, and saved along with its modifications for a later utilization thanks to the Save command in the File menu. The modification or the elimination of gauges to adapt the device to a new system or to modify the analysis of the same system is effected in a similar way. Only the functions associated with the gauges in question must eventually be recompiled.

The operation of the motor module will now be described in detail. The motor module is activated by the Execute command of the File menu in the graphic interface. Once activated, it displays an icon on the screen, then effects a connection to the system analyzed. For example, it connects itself to the Oracle DBMS. It then opens, or if necessary creates, the recommendations file, and then opens the commands file created by the graphic interface module and analyzes it sequentially. It synchronously initiates the functions associated with the investigations requested in the command file. For each investigation, the motor module looks at whether there is a global gauge function which is associated with it. If this is the case, it is passed together with, in parameter form, the list of gauges and their associated thresholds and function designations, and then for each gauge of this investigation that is associated with its own function, the motor module initiates the associated function in the same way. In the case in which no global gauge function is associated with the investigation, the motor module initiates the functions associated with each gauge of the investigation one by one. These functions can be internal functions, external executable programs, or in the case of a utilization for a DBA, the functions which call the SQL requests. In the case of an internal function, the motor module calls it by passing it the name of the gauge or the investigation as well as the necessary parameters, this function generally calling another function which is charged with actually conducting the investigation. This architecture corresponds to the division of the motor module into a module 21 for analyzing the command file and an inquiry module 22, as illustrated in FIG. 2. In the case of an external function, the motor module initiates it synchronously. Finally, in the case of an SQL request, the motor module calls an SQL_function in the inquiry module 22 by passing it the name of the gauge; this function is charged with conducting the investigation and generating the recommendations.

Once the investigations have been terminated, the motor module closes and destroys the command file, disconnects itself from the system analyzed, and finally initiates the potential user command before passing the icon onto the screen in reverse video mode to indicate the end of the execution. The user can therefore read the recommendations for the system in the recommendations file.

The module 21 for analyzing the command file first reads the first line of the command file and stores the sampling options chosen. Then, for each investigation, it verifies the presence of a global gauge function. If a global function exists and is the internal type, it constructs, from the list of gauges which constitute the investigation, a data structure to be passed to the global_advice function of the inquiry module. If it is an external function, the analysis module creates a command file which is restricted to the investigation, synchronously initiates the executable program by passing it the name of the file and that of the investigation in parameter form, then destroys the temporary command file. After the execution of the global gauge function, the module for analyzing the command file initiates the function that is individually associated to each gauge, if it exists. In the case in which the global gauge function does not exist, there is, for each gauge of the investigation, a construction of a structure and an initiation of the gauge-advice function (internal function) or SQL_ function (SQL request) of the inquiry module, depending on the type of the gauge function. If it is the external type, the analysis module initiates the function by the procedure described above for external global gauge functions, this time by passing the name of the gauge in parameter form.

Each function executed writes the associated recommendation in the recommendation file in case the numerical or logical threshold is exceeded.

The gauge_advice() function and the global_advice() function form the link between the module for analyzing the command file and the inquiry module. The gauge_advice() function informs the inquiry module that the recommendations on the gauge which has been put into in parameter form have been requested. The inquiry module is charged with the writing of the recommendations in the file passed in parameter. The return value of this function is an error code which equals 0 if there has been no error. The prototype is the following:

int gauge_advice(FILE *file_output, Gauge *gauge, Option *option);

The gauge parameter is a variable of the structure type which gives all the indications on the gauge, the associated threshold, the associated relationship symbol and the associated gauge function. The option parameter gives the indications on the sampling options (duration and period), which can be used by the gauge function.

The global_advice() function indicates to the inquiring module that the recommendations on the investigation which has been passed form in parameter have been requested. The inquiry module is charged with the writing of the recommendations on the file which has been passed in parameter form. The return value of this function is an error code which equals 0 if there has been no error. The prototype is the following:

int global_advice(FILE file_output, char *cons_investig, Gauge *gauge[], Option *option);

The cons_investig parameter gives the name of the investigation. The gauge parameter gives all the necessary information on the gauges of the investigation. The global function does not have to produce any recommendation for the gauges of the investigation which are associated with their own function. Finally, the parameter option indicates the sampling options.

The SQL_function function is called by the module for analyzing the command file when it detects that a gauge is associated with an SQL type function. It is therefore used in the case of the application of the device of the invention to data base administration. It returns an error code which equals 0 if everything has proceeded correctly. Its prototype is the following:

int SQL_function(FILE *fcom, Gauge *gauge);

The fcom parameter designates the recommendation file. The gauge parameter gives all the necessary pieces of information on the gauges on which the SQL request must have bearing. The function retrieves the text of the SQL request associated with the gauge then executes it, and if necessary, writes the recommendations in the recommendation file which has been passed in parameter.

Some indications of how the external functions are written will now be given. The external functions are carried out by executable programs. These programs accept the parameters -f, -o, -i, and -g which respectively indicate the name of the restricted command file that gives him information on the investigation to be conducted, the name of the recommendation file, the name of the investigation in question, and the name of the gauge in question. These programs open the recommendation file using the C-language command "append()," so as not to erase the recommendations produced by the preceding inquiries. They then extract the pieces of information requested on the system analyzed and, if necessary, they write the recommendations in the recommendations file. Before terminating, they must re-close the recommendation file.

All the external functions must evoke routines in order to analyze the command file which is transmitted to them in parameter form. A good solution, therefore, will be to construct a software library with these routines. Typically, this routine will contain functions for retrieving the number of gauges in the command file, for obtaining the name of the gauges, for obtaining the values of the recommendation thresholds and the associated relationship symbols, etc. This library will not be described in detail here, as its writing depends on the choices of implementation within the reach of the one skilled in the art who wishes to modify the gauge functions.

Preferably, the gauge file and the configuration file indicate two numerical thresholds associated with the gauges. The first threshold is the threshold from which a recommendation must be emitted by the device of the invention, by the method described previously. The second threshold, not illustrated in the appendix, is an alarm threshold. An alarm module, which is not part of the invention and therefore is not described here, is charged with permanently inspecting the system 2, for example using gauge functions which operate in the background. An alarm is emitted as soon as these gauge functions return values which have a certain relationship to the associated threshold. The alarm can consist of a sound message and the immediate display of a warning window on a screen connected to the device.

For example, a gauge which measures the fragmentation of a table space (tablespace) can be charged with emitting a recommendation when it turns out that, during a periodic utilization of the device of the invention, certain table spaces (tablespaces) are fragmented in such a way that the operation of the DBMS is no longer optimal. If during the utilization of the DBMS the fragmentation ratio exceeds an alarm threshold beyond which the operation of the DBMS is considered to be seriously diminished, then the alarm module operating in the background immediately emits an alarm.

In this way, the pieces of information which relate to the device of the invention and those which relate to the alarm module can be concentrated in the same data files. Preferably, the device of the invention can operate in a batch processing mode ("batch" mode). It then generates a command file directly from the configuration file which has been passed in parameter and activates the motor module without first displaying the graphic interface.

By way of example, and in order to better explain the significance of the concepts of gauges, investigations and fields, the utilization of the device of the invention for a data base administrator wishing to obtain pieces of information on the state of his data bases and his server will now be illustrated. The device is uniquely personalized for this particular type of application by editing the gauge, investigation and configuration files and by creating adapted external functions. The graphic interface module, the motor module, and the inquiry module are not modified by this personalization. This part of the description assumes that the reader is familiar with the concepts which relate to DBMSs, and more particularly familiar with relational DBMSs such as Oracle. For this utilization, three fields can be considered:

"space", which groups all the investigations that relate to the management of space.

"activity", which groups all the investigations that relate to the current activity.

"application", which groups all the investigations that relate to the utilization and the contents of the data base.

The space field groups the investigations "Object space", "Fragmentation", "Abnormal storage", "Disk space", and "user quota". The activity field groups the investigations "Activity in progress", "OS (operating system) activity", and "Backward return (Rollback) activity". The application field groups the investigations "Contents of the object" and "Bad object".

A review of these investigations will now be made, by way of illustration. Each investigation is divided into gauges for whose significance, associated threshold, and associated recommendation are indicated.

1.1 The "Object space" investigation groups all the gauges which verify the fill ratio of the space allocated to the cluster, index, backward return (rollback) segment, table, and table space (tablespace) objects of the data base. It is constituted by the following gauges.

1.1.1. The "space used by cluster/index/table full" gauge searches for objects whose utilized space exceeds the threshold of the percentage of space allocated.

Recommendation: In order to avoid dynamic extension and fragmentation, recreate the object XXX whose fill ratio is XX% with greater storage values, particularly for the INITIAL parameter.

1.1.2. The "Space used by table space (tablespace) full" gauge searches for table spaces (tablespaces) whose utilized space exceeds the threshold of the percentage of space allocated.

Recommendation: The table space (tablespace) XXX is almost full (allocation ratio XX%); add a file to it to enlarge it or add a table space (tablespace) to enlarge the space of the data base.

1.1.3. The "MAXEXTENT" gauge searches for objects whose maximum number of extensions (extents) has been reached (no numerical threshold).

Recommendation: The maximum number of extensions (XX) of the object XXX has been reached; estimate the size of the object and choose storage parameters so that all the data could be placed in a single extension (on a disk if the object is too large); the size of each extension on a disk must be large enough to contain all the blocks on that disk.

1.1.4. The "extension impossible" gauge searches for objects whose table space (tablespace) cannot contain the next extension (no numerical threshold).

There can be two origins for its triggering, so that there will be two associated recommendations, and the associated gauge function is charged with giving the right one based on the origin.

Recommendation 1 if the table space (tablespace) is too small: The table space (tablespace) YYY is too small to contain the next extension of the object XXX; increase its size by adding a file to it.

Recommendation 2 if the table space is too fragmented: The table space YYY is too fragmented to contain the next extension of the object XXX; reorganization of the table space will allow the extension.

1.2. The "fragmentation" investigation groups all the gauges which verify the fragmentation of the objects in the data base. It is constituted by the following gauges:

1.2.1. The "too many extensions (extents)" gauge searches for objects whose number of extensions exceeds the threshold or whose maximum number of extensions has been reached.

Recommendation: The object XXX is too fragmented (XX extents, maximum MAXEXTENTS); estimate the size of the object and choose storage parameters so that all the data could be placed in a single extension (on a disk if the object is too large); the size of each extension on a disk must be large enough to contain all the blocks on that disk.

1.2.2. The "fragmented table space (tablespace)" gauge searches for table spaces in which the size of the largest gap is smaller than the threshold or in which the average size of an extension (extent) is larger than the size of the largest gap.

Recommendation: The table space XXX is too fragmented; reorganize the table space and perhaps even enlarge it.

1.2.3. The "noncontinuous file" gauge searches for files with several extensions (extents) on the disk (point of view of the operating system OS).

Recommendation: The file XXX is fragmented on the disk, creating excessive movements of the disk-reading head which lengthens the access times; reorganize the file.

1.3. The "abnormal storage" investigation groups the gauges which relate to other abnormalities in the utilization of space by the objects in the data base.

1.3.1. The "Abnormal extensions of back return segments (rollback segments)" gauge searches for rollback segments whose extensions (extents) are not of equal size. Recommendation: The rollback segment XXX has extensions of unequal size; this can lead to improper utilization of the rollback segment by Oracle; recreate the rollback segment using the parameters NEXT=INITIAL and PCTINCREASE=0.

1.4 The "Disk space" investigation groups the gauges which relate to the occupation of disk space from the point of view of the operating system.

1.4.1. The "Disk full" gauge searches for disks whose occupation ratio has exceeded the threshold (as a percentage of the total space on the disk).

Recommendation: The disk XXX has an occupation ratio of XX%.

1.5. The "User quota" investigation groups the gauges which analyze the quotas for utilization of the space in the data base.

1.5.1. The "Users' space quota" gauge searches for users whose space utilization ratio exceeds the threshold (as a percentage of their quota).

Recommendation: User XXX is nearing his space quota (utilization ratio XX%); increase the user's quota.

2.1. The "Activity in progress" investigation groups the gauges which analyze the activity in progress.

2.2. The "OS activity" investigation groups the gauges which relate to activity of the operating system.

2.3. The "Back return (rollback) activity" investigation groups the gauges which relate to the activity of the rollback segments.

2.3.1. The "Dormant rollback segment" gauge searches for rollback segments which are not in use (no numerical threshold).

Recommendation: The rollback segment XXX is not in use; if it is not used by others, destroy it in order to gain space.

2.3.2. The "Additional rollback segment" gauge verifies that there was not only the SYSTEM rollback segment (no numerical threshold).

Recommendation: Only the SYSTEM rollback segment is active; it is used by the nucleus and the processor in the background; create another rollback segment for the applications.

3.1. The "Contents of the objects" investigation groups the gauges which relate to abnormalities in the contents of the objects (cluster, index, table).

3.1.1. The "Chained block" gauge searches for tables whose ratio of chained blocks has exceeded a threshold (as a percentage of the total number of blocks).

Recommendation: The table XXX has a chained block ratio of XX%; this increases the number of inputs/outputs; recreate the table with a stronger PCTFREE.

3.1.2. The "empty index" gauge searches among the nearly full indexes (occupation ratio greater than 80 percent of the space allocated) for the indices whose block utilization ratio is lower than the threshold as a percentage.

Recommendation: The index XXX is almost full and is using the space improperly (XX%); reorganize it.

3.2. The "Bad object" investigation groups the gauges which relate to abnormalities in the name or the definition of objects.

3.2.1. The "Bad view" gauge searches for views which contain the clauses GROUP BY, UNION, MINUS, INTERSECT or external joints (outer joints).

Recommendation: The view XXX contains instructions which obligate Oracle to recalculate and record the contents of the view with each access.

3.2.2. The "Inappropriate name" gauge searches for objects which have the same name as a public synonym.

Recommendation: The object XXX of the user YYY has the same name as a public synonym; the user can not access the synonym.

GAUGE FILE field Space
subfield Table
...
end-subfield
subfield Table Space (tablespace TS)
    gauge TS almost full
        comment
        This gauge indicates all the table spaces
(tablespaces) that are almost full by testing the ratio of
space used. The threshold is a percentage of the size of the
table space TS.
        end-comment
        advice-function DBA_EXPERT_INTERNAL
        advice threshold>80
        advice
        The table space(s) TS%s is (are) almost full
(ratio of space used = %d%%). You can add data base files to
enlarge this (these) table space(s) TS, or create new table
spaces TS in order to enlarge the data base or to allocate
space for certain applications.
        end-advice
    end-gauge
    gauge TS fragmented
        comment
        This gauge indicates all the table spaces TS which
are highly fragmented by testing whether the average size of
the extensions (extents) is greater than the size of the
largest gap.
        end-comment
        advice-function
/DBA_EXPERT/bin/get_fragm_tablespace
        advice
        The table space(s) TS%s is (are) probably too
fragmented. Analyze the space of this (these) table space(s)
and if too fragmented, consider reorganizing it (them).
        end-advice
    end-gauge
...
end-subfield
...
end-field
activity field
...
end-field
...

INVESTIGATIONS FILE field Space
advice-investigation Index
...
end-advice-investigation
advice-investigation Table
...
end-advice-investigation
advice-investigation Table Space (tablespace TS)
    gauge TS almost full
    end-gauge
    gauge TS fragmented
    end-gauge
end-advice-investigation
...
end-field
field Activity
advice-investigation Activity in progress
advice-function DBA_EXPERT_INTERNAL
...
end-advice-investigation
...
end-field
...

THE CONFIGURATION FILE field Space
advice-investigation Index
...
end-advice-investigation -continued

```
advice-investigation Table
...
end-advice-investigation
advice-investigation Table Space (tablespace TS)
    gauge TS almost full
        threshold>80
      end-gauge
    gauge TS fragmented
    end-gauge
end-advice-investigation
...
end-field
field Activity
advice-investigation Activity in progress
...
end-advice-investigation
...
end-field
...
command echo DB*ADVISOR terminated ! mail DBA
output /tmp/recommendations
```

THE COMMANDS FILE

```
sampling duration 3600 period 300
advice-investigation Index
...
end-advice-investigation
advice-investigation Table
...
end-advice investigation
advice-investigation Table Space (tablespace TS)
    gauge TS almost full
        advice-function DBA_EXPERT_INTERNAL
        advice threshold>80
        advice
            The table space(s) TS%s is (are) almost full (space
utilization ratio = %d%%). You can add data base files to
enlarge this (these) table space(s) TS, or create new table
spaces in order to enlarge the data base or to allocate space
for certain applications.
        end-advice
      end-gauge
    gauge TS fragmented
        advice-function /DBA_EXPERT/bin/get_fragm_
tablespace
        advice
            The table space(s) TS%s is (are) probably too
fragmented. Analyze the space of this (these) table space(s)
TS, and if too fragmented, consider reorganizing it (them).
        end-advice
    end-gauge
...
advice-investigation Activity in progress
    advice-function DBA_EXPERT_INTERNAL
...
end-advice-investigation
...
command echo DB*ADVISOR terminated !mail DBA
```

I claim:

1. A process for analyzing a state of a system to advise a user of the system on said state, the process comprising:.

using a set of gauges, each gauge relating to a piece of information on said state of the system and being associated with at least one gauge function, each gauge function relating to a measurement to be performed on the system to have said piece of information;

using a first data file for designating said gauge functions;

making from said first data file a second data file controllable by the user to contain the designation of the gauge functions to be applied to the system;

analyzing said second data file and applying said gauge functions to the system for performing said measurements of system to have corresponding values dependent on said state of the system;

defining recommendations for use of the system in accordance with conditions on said values;

analyzing said values with respect to said conditions to have those of said recommendations which are appropriate to said values; and displaying said appropriate recommendations for the system on a screen or storing them in a file.

2. The process of claim 1, wherein at least one part of the gauge functions is designated in said first and second data files by a name and a data path of an executable program.

3. The process of claim 1, wherein at least one part of the gauge functions is designated in said first and second data files by text of a request.

4. The process of claim 1, wherein the first and second data files are text files.

5. The process of claim 1 wherein the second data file is made by the user by means of a graphic interface, the step of analyzing the second data file is made by means of an analysis module of a motor module, and the steps of applying the gauge functions, analyzing the values with respect to the conditions and emitting the appropriate recommendations are made by means of an inquiry module of the motor module, and the graphic interface and the motor module are independent from the system analyzed.

6. The process of claim 1, further including providing a name data file, wherein each gauge has a name contained in said name data file and the second data file is also made from the name data file to contain the names of the gauges associated with the gauge functions designated in said second data file.

7. The process of claim 6, wherein the name data file is a text file.

8. The process of claim 1, further including providing a recommendations data file, wherein each gauge is associated with at least one of said recommendations, said recommendations being contained in said recommendations data file, and the second data file is also made from the recommendations data file to contain the recommendations associated with the gauge functions designated in said second data file.

9. The process of claim 8, wherein the recommendations data file is a text file.

10. The process of claim 1, further including providing alarm data file, wherein said alarm data file contains alarm thresholds associated with the gauges and the second data file is also made from the alarm data file to contain the alarm thresholds of the gauges associated with the gauge functions designated in the second data file.

11. The process of claim 10, wherein the alarm data file is a text file.

12. The process of claim 1, wherein the gauges are grouped into investigations and global gauge functions are associated with at least one part of the investigations, and further wherein the process further comprises using an investigation file which includes the investigations, the gauges which constitute these investigations and designations of the global gauge functions and establishing the second data file from data in the investigation file to contain the investigations to be applied to the system and the designations of the global gauge functions associated with these investigations.

13. The process of claim 12, wherein the second data file is a text file.

14. The process of claim 1, further including providing a thresholds data file, wherein each gauge is also associated with at least one numerical or logical threshold values of said conditions, said numerical threshold values being contained in said thresholds data file and said second data file also contains the numerical values of the gauges associated with the gauge functions designated in said second data file, and the appropriate recommendations are emitted when the values have a certain relationship to the associated thresholds.

15. The process of claim 14, wherein in said second and thresholds data files a symbol (>, <, =, ...) is associated with one of the numerical thresholds, said symbol indicating whether the associated recommendation must be triggered when the value corresponding to the associated gauge function moves above or below the threshold or when it does not have the value of the threshold or when any other logical relationship exists between the threshold value and the value corresponding to the gauge function.

16. The process of claim 14, wherein the thresholds data file is a text file.

17. A software tool for analyzing a state of a system to advise a user of the system on said state, the tool using a set of gauges for analyzing the system, each gauge relating to a piece of information on said state of the system and being associated with at least one gauge function, each gauge function relating to a measurement to be performed on the system to have said piece of information, the tool also using recommendations for use of the system in accordance with conditions on values corresponding to said measurements and the tool comprising:

a first data file for designating said gauge functions;

means for making from said first data file a second data file controllable by the user to contain the designation of the gauge functions to be applied to the system;

means for analyzing said second data file;

means for applying said gauge functions to the system for performing said measurements of the system to have said values which are dependent on said state of the system;

means for analyzing said values with respect to said conditions and to have those of said recommendations which are appropriate to said values; and means for displaying said appropriate recommendations for the system on a screen or storing them in a file.

18. The tool of claim 17, wherein at least one part of the gauge functions is designated in said first and second data files by text of a request.

19. The tool of claim 17, further including a recommendations data file, wherein each gauge is associated with at least one of said recommendations, said recommendations being contained in said recommendations data file, and the second data file is also made from said recommendations data file to contain the recommendations associated with the gauge functions designated in said data file.

20. The tool of claim 17, further including an alarm data file, wherein the alarm data file contains alarm thresholds associated with the gauges and the second data file is also made from the alarm data file to contain the alarm thresholds of the gauges associated with the gauge functions designated in the second data file.

21. The tool of claim 17, wherein the first and second data files are text files.

22. The tool of claim 17, wherein the system is a data base system and the tool is included in a data base management system for said data base system.

23. The tool of claim 17, wherein at least one part of the gauge functions is designated in said first and second data files by a name and a data path of an executable program.

24. The tool of claim 23, wherein at least one part of the gauge functions is designated in said first and second data files by text of a request.

25. The tool of claim 17, wherein said means for making the second file includes a graphic interface, said means for analyzing the second data file includes an analysis module of a motor module and said means for applying the gauge functions, analyzing the values with respect to the conditions and emitting the appropriate recommendations includes an inquiry module of the motor module, and in that the graphic interface and the motor module are independent from the system analyzed.

26. The tool of claim 25, wherein the system is a data base system and the tool is included in a data base management system for said data base system.

27. The tool of claim 17, further including a thresholds data file, wherein each gauge is also associated with at least one numerical or logical threshold values of said conditions, said numerical threshold values being contained in said thresholds data file and said second data file also contains the numerical values of the gauges associated with the gauge functions designated in said second data file, and the appropriate recommendations are emitted when the values have a certain relationship to the associated thresholds.

28. The tool of claim 27, wherein in said second and thresholds data files a symbol (>, <, =, ...) is associated with one of the numerical thresholds, said symbol indicating whether the associated recommendation must be triggered when the value corresponding to the associated gauge function moves above or below the threshold or when it does not have the value of the threshold or when any other logical relationship exists between the threshold value and the value corresponding to the gauge function.

29. The tool of claim 27, wherein the gauges are grouped into investigations, and including:

an investigation file which includes the list of investigations, the gauges which constitute these investigations and designations of the global gauge functions associated with at least one part of the investigations, a gauge file which includes the list of all the gauges, of all the associated recommendations, of the thresholds associated to at least certain gauges and of the gauge functions associated to at least certain gauges;

a configuration file being established from data in the gauge file and data in the investigation file.

30. The tool of claim 29, wherein the configuration file is a text file.

31. The tool of claim 29, wherein the configuration file contains a list of alarm thresholds associated with the gauges.

32. The tool of claim 29, wherein different gauge functions are associated with gauges in the gauge file and with the corresponding investigations in the investigation file such that the configuration file is established by using the gauge functions of the investigation file for said gauges.

* * * * *